（12）United States Patent
Watanabe et al.

(10) Patent No.: US 9,308,897 B2
(45) Date of Patent: Apr. 12, 2016

(54) BRAKE CONTROL DEVICE

(71) Applicant: Mitsubishi Jidosha Kogyo Kabushiki Kaisha, Tokyo (JP)

(72) Inventors: Yu Watanabe, Tokyo (JP); Kenji Kondo, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 6 days.

(21) Appl. No.: 14/445,140

(22) Filed: Jul. 29, 2014

(65) Prior Publication Data

US 2015/0035349 A1 Feb. 5, 2015

(30) Foreign Application Priority Data

Jul. 30, 2013 (JP) ................................ 2013-158354

(51) Int. Cl.
| | |
|---|---|
| *B60T 7/04* | (2006.01) |
| *B60T 7/06* | (2006.01) |
| *B60T 11/10* | (2006.01) |
| *B60T 1/10* | (2006.01) |
| *B60T 13/58* | (2006.01) |
| *B60T 13/66* | (2006.01) |
| *B60L 7/12* | (2006.01) |
| *B60L 7/26* | (2006.01) |
| *B60L 11/18* | (2006.01) |
| *B60L 15/20* | (2006.01) |
| *B60L 7/18* | (2006.01) |

(52) U.S. Cl.
CPC ... *B60T 7/06* (2013.01); *B60L 7/12* (2013.01); *B60L 7/26* (2013.01); *B60L 11/1805* (2013.01); *B60L 15/2009* (2013.01); *B60T 1/10* (2013.01); *B60T 7/042* (2013.01); *B60T 11/103* (2013.01); *B60T 13/586* (2013.01); *B60T 13/662* (2013.01); *B60L 7/18* (2013.01); *B60L 2240/12* (2013.01); *B60L 2240/421* (2013.01); *B60L 2240/423* (2013.01); *B60L 2250/16* (2013.01); *B60L 2250/26* (2013.01)

(58) Field of Classification Search
CPC ..... B60T 7/042; B60T 13/586; B60T 13/662; B60L 7/18
USPC ....................... 303/151, 152, 113.4
See application file for complete search history.

(56) References Cited

U.S. PATENT DOCUMENTS

| | | | | |
|---|---|---|---|---|
| 5,162,625 | A | * | 11/1992 | Comerford ............ H01H 3/166 200/61.89 |
| 5,186,524 | A | * | 2/1993 | Burgdorf ................. B60T 8/38 303/10 |
| 5,219,442 | A | * | 6/1993 | Burgdorf ................. B60T 8/38 303/113.3 |

(Continued)

FOREIGN PATENT DOCUMENTS

JP  2010-149797 A  7/2010

*Primary Examiner* — Thomas Irvin
(74) *Attorney, Agent, or Firm* — Birch, Stewart, Kolasch & Birch, LLP

(57) ABSTRACT

A brake control device is provided that can reduce the driver's uncomfortable feeling even when operation amount detection means is broken down. When abnormality determination means 71 for determining abnormality of a pedal stroke sensor 3 determines that the operation amount detection means is abnormal, a predetermined regenerative torque is set to the generator (rotary electric machine) 9 upon sensing the pressing of a brake pedal by a stop lamp switch 4, and a predetermined maximum regenerative torque is set to the generator (rotary electric machine) 9 upon sensing the pressing of the pedal by a cruise control switch 42.

4 Claims, 6 Drawing Sheets

(56) References Cited

U.S. PATENT DOCUMENTS

| | | | | |
|---|---|---|---|---|
| 5,390,987 A * | 2/1995 | Willi | ................ | B60T 8/26 303/113.5 |
| 5,670,761 A * | 9/1997 | Ryan | ................ | H01H 13/64 200/16 B |
| 5,889,246 A * | 3/1999 | Frank | ................ | H01H 3/166 200/61.89 |
| 6,101,896 A * | 8/2000 | Engelgau | ................ | G05G 1/30 123/399 |
| 6,454,365 B1 * | 9/2002 | Arwine | ................ | B60T 7/042 303/113.4 |
| 6,612,659 B2 * | 9/2003 | Fulks | ................ | B60Q 1/44 188/1.11 E |
| 7,426,975 B2 * | 9/2008 | Toyota | ................ | B60K 6/445 180/165 |
| 8,050,836 B2 * | 11/2011 | Karnjate | ................ | B60T 8/172 188/358 |
| 8,655,533 B2 * | 2/2014 | Takagi | ................ | B60W 10/08 180/65.265 |
| 2011/0066345 A1 * | 3/2011 | Nasu | ................ | B60L 7/24 701/70 |
| 2012/0074768 A1 * | 3/2012 | Naito | ................ | B60T 1/10 303/3 |
| 2012/0161505 A1 * | 6/2012 | Koyama | ................ | B60T 1/10 303/9.62 |
| 2012/0200409 A1 * | 8/2012 | Hill | ................ | B60Q 1/441 340/453 |
| 2015/0191159 A1 * | 7/2015 | Akamine | ................ | B60T 8/1755 701/22 |

* cited by examiner

BRAKE CONTROL DEVICE

BACKGROUND OF THE INVENTION

1. Field of the Invention

The present disclosure relates to a brake control device for controlling a regenerative braking force, and more specifically, a brake control device that can control the regenerative braking force without making a driver feel very uncomfortable even when operation amount detection means for detecting an operation amount of a brake pedal is broken down.

2. Description of the Related Arts

A brake control device for controlling a regenerative braking force causes a rotary electric machine to generate a regenerative braking force corresponding to an operation amount of a brake pedal. The operation amount of the brake pedal is detected by operation amount detection means (stroke sensor), and a regenerative braking force corresponding to the operation amount of the brake pedal detected is generated by the rotary electric machine.

A technique is proposed for controlling the regenerative braking force of the rotary electric machine by using two operation amount detection means (stroke sensors) for detecting the operation amount of the brake pedal, and an operation sensing means (stop lamp switch) for sensing the operation of the brake pedal. When one of the two operation amount detection means is broken down, the other detection means and the operation sensing means are operated to detect the operation amount of the brake pedal, thereby controlling the regenerative braking force. According to this technique, the regenerative braking force corresponding to the operation amount of the brake pedal is generated by the rotary electric machine even when one of the two operation amount detection means is broken down. As a result, even when either of the two operation amount detection means is broken down, this technique can reduce the driver's uncomfortable feeling (see, for example, patent document 1).

However, the technique disclosed in Patent Document 1 described above (Japanese Unexamined Patent Publication No. 2010-149797) includes two operation amount detection means, which leads to a high cost and a complicated control procedure as compared to a technique with only one operation amount detection means.

The present invention has been made in view of the foregoing circumstances, and it is an object of at least one embodiment of the present invention to provide a brake control device that can reduce the driver's uncomfortable feeling even when the operation amount detection means is broken down without increasing the cost and without making the control procedure complicated.

SUMMARY OF THE INVENTION

Taking into consideration the circumstances described above, a brake control device according to at least one aspect of the invention includes operation amount detection means for detecting an operation amount of a brake pedal; abnormality determination means for determining abnormality of the operation amount detection unit; first sensing means for sensing that the brake pedal is operated by an amount exceeding a predetermined first operation amount; second sensing means for sensing that the brake pedal is operated by an amount exceeding a predetermined second operation amount, the second operation amount being larger than the first operation amount; and regeneration control means adapted to make information from the operation amount detection means invalid when the abnormality determination means determines that the operation amount detection means is abnormal, thereby setting a first predetermined regenerative torque to the rotary electric machine upon sensing of the operation by the first sensing means, or a second predetermined regenerative torque which is larger than the first regenerative torque to the rotary electric machine upon sensing of the operation by the second sensing means.

In this way, even though the operation amount detection means is broken down, the predetermined first torque is set to the rotary electric machine upon sensing of the operation by the first sensing means, and the predetermined second torque is set to the rotary electric machine upon sensing of the operation by the second sensing means. Thus, the regenerative braking force is increased in stages, which can reduce the driver's uncomfortable feeling even when the operation amount detection means is broken down.

According to another aspect of the invention, the first sensing means is a stop lamp switch adapted to light up a stop lamp of a vehicle.

Thus, the stop lamp switch is also used as the first sensing means, which does not additionally require the first sensing means.

According to another aspect of the invention, the second sensing means is a cruise controller release switch for releasing constant-speed traveling of the vehicle.

Thus, the cruise controller release switch is also used as the second sensing means, which does not additionally require the second sensing means.

According to another aspect of the invention, the brake control device further includes a hydraulic brake using hydraulic pressure, a hydraulic braking detection means for detecting the operation amount of the brake pedal in a detection way different from the operation amount detection means, and a hydraulic braking control means for setting a braking torque corresponding to the operation amount detected by the hydraulic braking detection means, to the hydraulic brake, in which the hydraulic braking detection means is adapted to detect a pressing amount of the brake pedal as an amount of change in hydraulic pressure, and in which the operation amount detection means is adapted to detect the pressing amount of the brake pedal as an electric signal.

With this arrangement, even though the regenerative brake becomes abnormal, the independent mechanical brake operates as usual, which can reduce the uncomfortable feeling.

According to another aspect of the invention, when the abnormality determination means determines that the operation amount detection means is normal, the regeneration control means is adapted to set the second regenerative torque such that the second regenerative torque is equal to a maximum regenerative torque to be set at the rotary electric machine.

With this arrangement, the control of the second regenerative torque can be simplified.

DESCRIPTION OF THE PREFERRED EMBODIMENTS

Preferred embodiments of a brake control device according to the invention will be described in detail below with reference to the accompanying drawings. The invention is not limited to the embodiments described below.

Figure 1:
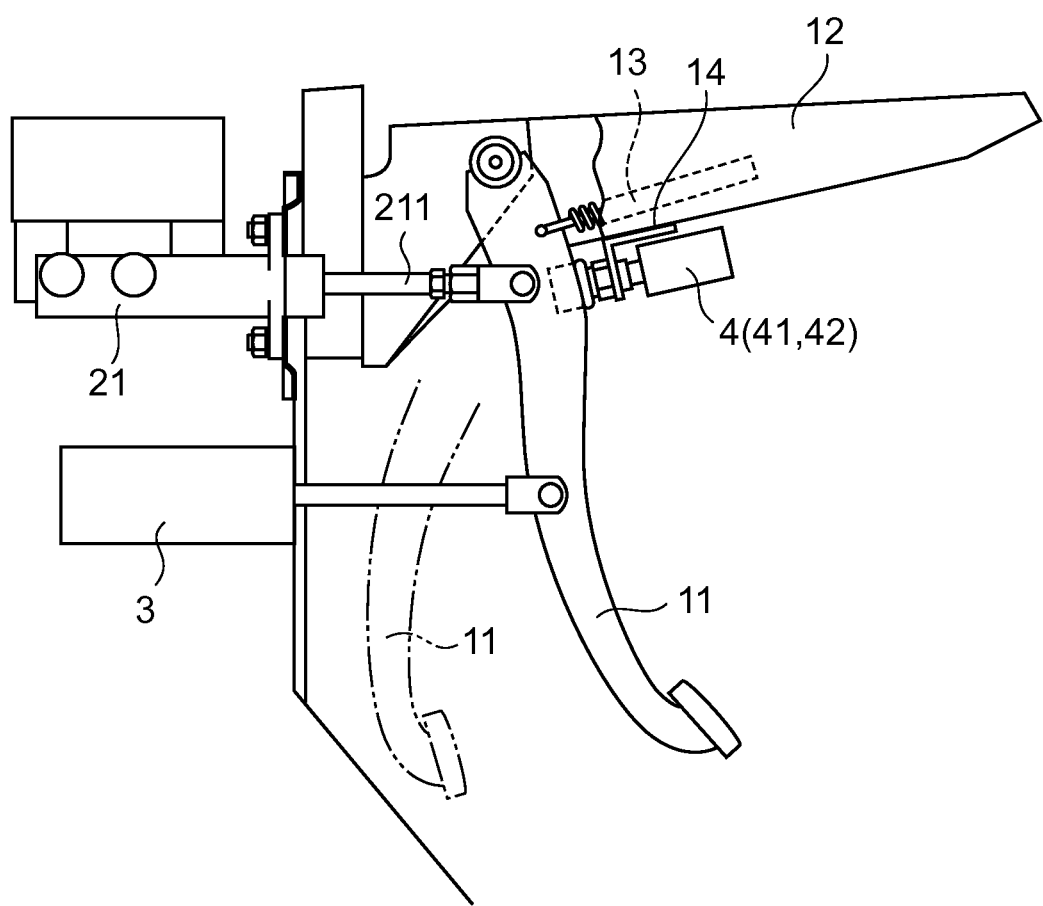
FIG. 1 is an exemplary diagram showing the structure of a brake pedal and its surroundings of a vehicle.
Figure 2:
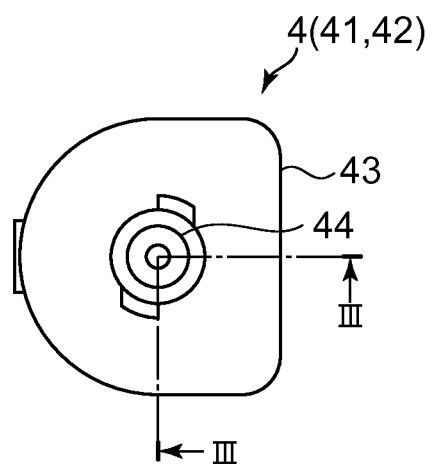
FIG. 2 is a front view of a pedal switch shown in FIG. 1.
Figure 3:
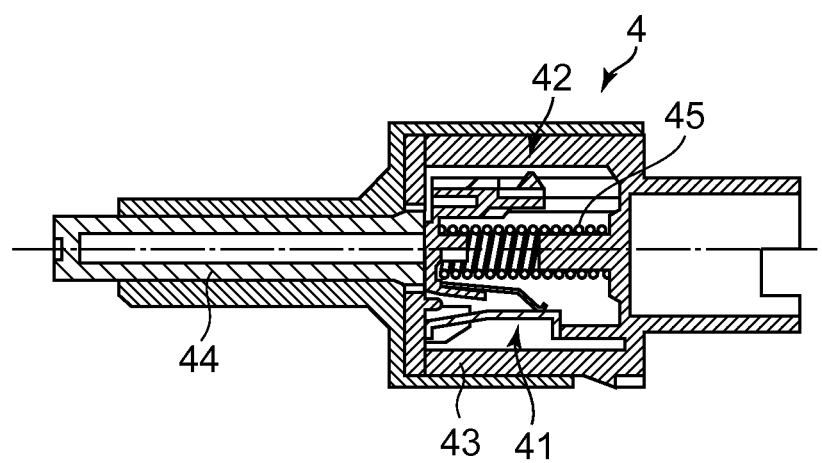
FIG. 3 is a cross-sectional view of the pedal switch taken along the line shown in FIG. 2.
Figure 4:
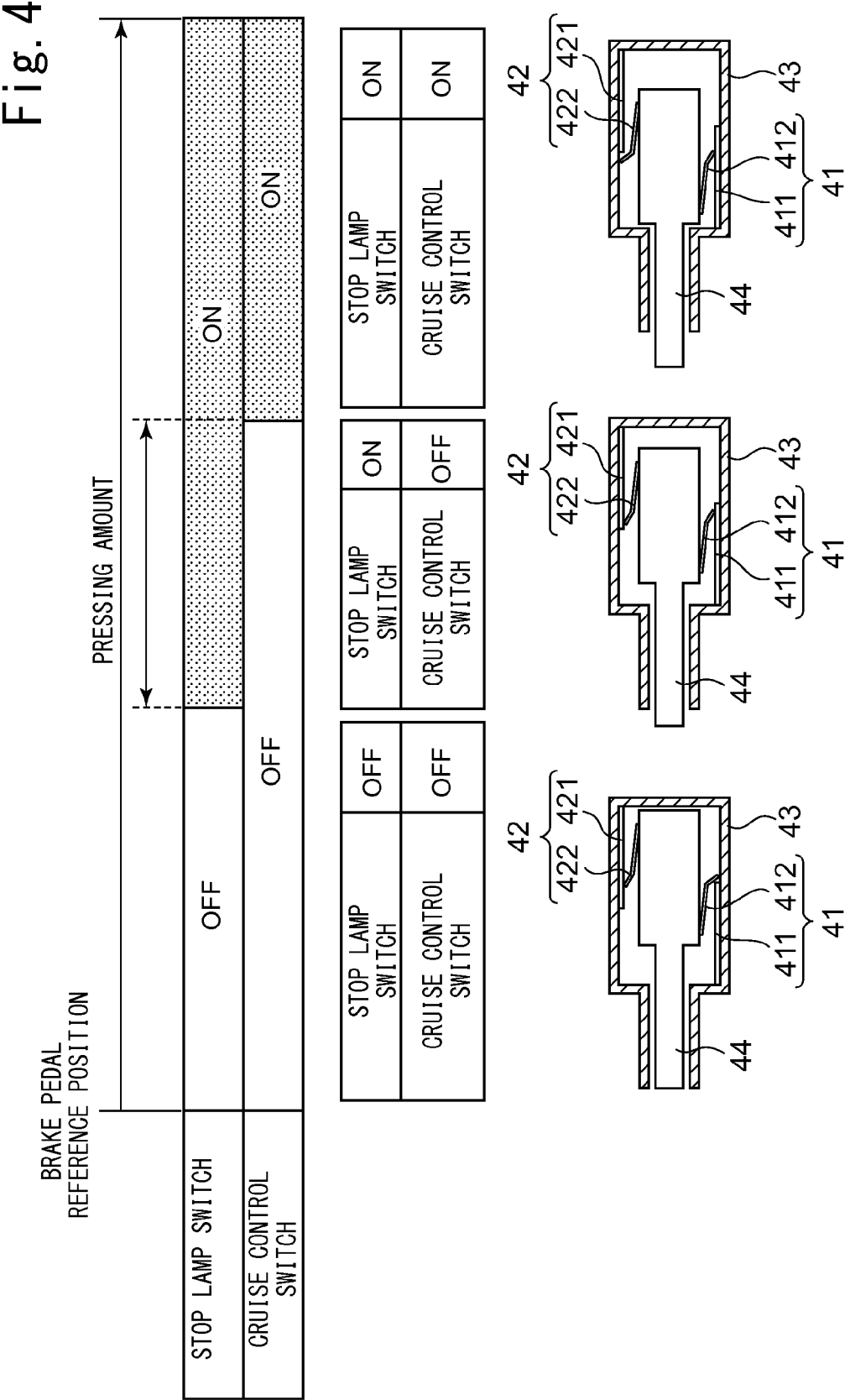
FIG. 4 is an exemplary diagram for explaining the structures of pedal switches and energization states thereof.

FIG. 1 shows an exemplary diagram of the structure of a brake pedal and its surroundings of a vehicle. FIG. 2 is a front view of a pedal switch shown in FIG. 1, and FIG. 3 is a cross-sectional view of the pedal switch taken along the line shown in FIG. 2. FIG. 4 shows an exemplary diagram for explaining the structures of the pedal switches and energization states thereof.

The brake control device in the one embodiment of the invention is to control a braking force (regenerative braking force) in regenerating kinetic energy of the vehicle into electric energy. The brake control device receives an input of a pressing amount (operation amount) of the brake pedal disposed on a driver's seat of the vehicle.

As shown in FIG. 1, a brake pedal 11 is provided in an area around the foot of the driver's seat. The brake pedal 11 is rotatably mounted on a vehicle body. More specifically, the brake pedal 11 is rotatably mounted on a master cylinder bracket 12 installed on the vehicle body. On a vehicle front side (engine room) of the master cylinder bracket 12, a master cylinder (hydraulic braking control means) 21 is mounted. The master cylinder 21 is to transfer a pressing force (operation force) generated by the brake pedal 11 to a hydraulic brake (mechanical brake) 22 (see FIG. 5). The master cylinder 21 includes a piston (not shown) reciprocating within the master cylinder 21, and a push rod 211 integrally provided with the piston. The piston and push rod 211 correspond to a hydraulic braking detection unit described in claims of the present application. The tip end of the push rod 211 is coupled to a rotation fulcrum point side (base end side) of the brake pedal 11. When the brake pedal 11 is pressed down, the piston within the master cylinder 21 is pushed via the push rod 211, thereby applying a pressure to a brake fluid (brake liquid) within the master cylinder 21. The applied pressure (hydraulic pressure) is transferred to the hydraulic brake 22, causing the hydraulic brake 22 to generate a braking force therefrom.

The brake pedal 11 can be adjusted as appropriate to adjust a height of the pedal before being pressed, a looseness from the beginning of pressing the pedal to the application of the pressure to the brake fluid, and a clearance formed between the pedal and a floor plate in pressing the pedal to the maximum. When the brake pedal 11 is pressed, the brake pedal 11 idles by the looseness, and then applies the pressure to the brake fluid. The applied pressure is transferred to the hydraulic brake 22, causing the hydraulic brake 22 to generate a braking force therefrom. The braking force of the hydraulic brake 22 is proportional to the applied pressure, and thus proportional to the pressing force (pressing amount) of the brake pedal 11.

A return spring 13 is provided to bridge between the brake pedal 11 and the master cylinder bracket 12. Thus, when the pressing of the brake pedal 11 is discontinued, the brake pedal 11 is returned to a height of the pedal before being pressed.

On the vehicle front side of the brake pedal 11, a pedal stroke sensor 3 is provided. The pedal stroke sensor 3 is to detect the pressing amount (operation amount) of the brake pedal 11. The pedal stroke sensor 3 can detect the pressing amount in a range from an original height of the brake pedal 11 before pressing to a height of the brake pedal 11 pressed to the maximum. The pedal stroke sensor 3 is to convert the pressing amount of the brake pedal 11 into an electric signal and then to output the signal. The pedal stroke sensor 3 is configured to have a detection mechanism that is different and independent from the master cylinder 21 so as not to affect the performance of the hydraulic brake 22 even though the pedal stroke sensor 3 is broken down.

On the vehicle rear side of the brake pedal 11, a pedal switch 4 is provided. The pedal switch 4 is mounted on the master cylinder bracket 12 via a switch bracket 14. The pedal switch 4 includes a stop lamp switch (first sensing means) 41, and a cruise control switch (second sensing means) 42.

A stop lamp switch 41 is to light up a stop lamp 5 of the vehicle (see FIG. 5) disposed on the rear part of the vehicle. When the brake pedal 11 is pressed (when the pedal is operated by an amount exceeding a predetermined first operation amount), the stop lamp switch 41 is adapted to sense the pressing. On the other hand, when the pressing of the brake pedal 11 is discontinued (the operation thereof is discontinued), the stop lamp switch 41 is adapted to sense the discontinuation.

The cruise control switch 42 is to release the constant-speed traveling (auto cruise). When the brake pedal 11 is pressed by a certain amount (when the pedal is operated by an amount exceeding a second operation amount which is larger than the first operation amount), the cruise control switch is adapted to sense the pressing.

As shown in FIGS. 2 and 3, the pedal switch 4 includes a case 43, a push rod 44, and a compression spring 45. The case 43 is an accommodation case for accommodating therein the push rod 44 and the compression spring 45. As shown in FIG. 1, the case 43 is fixed to the master cylinder bracket 12 via the switch bracket 14. The case 43 is provided with a fixed terminal 411 included in the stop lamp switch 41, and another fixed terminal 421 included in the cruise control switch 42 (see FIG. 4). The push rod 44 is reciprocatably accommodated in the case 43. The push rod 44 is provided with a movable terminal 412 included in the stop lamp switch 41, and another movable terminal 422 included in the cruise control switch 42 (see FIG. 4). As shown in FIG. 3, the compression spring 45 is mounted inside the case 43, and between the case 43 and the push rod 44, and is urged in the direction of progress of the pushrod 44 from the case 43.

Thus, as shown in FIG. 4, with the push rod 44 being pushed into the case 43, the fixed terminal 411 and the movable terminal 412 of the stop lamp switch 41 are spaced apart from each other (in non-energization), whereby the stop lamp switch 41 is turned off (at a connection point A). At this time, the fixed terminal 421 and the movable terminal 422 of the cruise control switch 42 are brought into contact with each other (in energization), whereby the cruise control switch 42 is turned off (at a connection point B).

With the push rod 44 being slightly pushed into the case 43, the fixed terminal 411 and the movable terminal of the stop lamp switch 41 are brought into contact with each other (in energization), whereby the stop lamp switch 41 is turned on.

At this time, the cruise control switch 42 continues to be energized, and the cruise control switch 42 continues to be turned off.

With the push rod 44 being completely pushed out of the case 43 (in the state shown in FIG. 3), the stop lamp switch 41 continues in the energization state, and in other words the stop lamp switch 41 continues to be turned on. At this time, the fixed terminal 421 and the movable terminal 422 of the cruise control switch 42 are spaced apart from each other (in non-energization), whereby the cruise control switch 42 is turned on.

With the push rod 44 being pushed into the case 43, when the push rod 44 is pushed against and mounted on the rotation fulcrum point side (base end side) of the brake pedal 11 (see FIG. 1), the push rod 44 is pushed into the case 43 before pressing the brake pedal 11, whereby the stop lamp switch 41 and the cruise control switch 42 are turned off.

When the brake pedal 11 is pressed from this state, the push rod 44 is slightly protruded from the case 43 (in a state where the push rod 44 is slightly pushed into the case 43). Then, the stop lamp switch 41 is turned on, and the cruise control switch 42 continues to be taken off.

When the brake pedal 11 is further pressed from this state, the push rod 44 is completely pushed out of the case 43. Then, the stop lamp switch 41 continues to be turned on, and the cruise control switch 42 is turned on.

The reason why the above pedal switch 4 is in the non-energization state when the stop lamp switch 41 is turned off and the above pedal switch 4 is in the energization state when the cruise control switch 42 is turned off is that either the fixed connection or movable connection is constantly established to allow the electricity to constantly flow through the pedal switch 4, which facilitates finding of a break of a wire.

Figure 5:
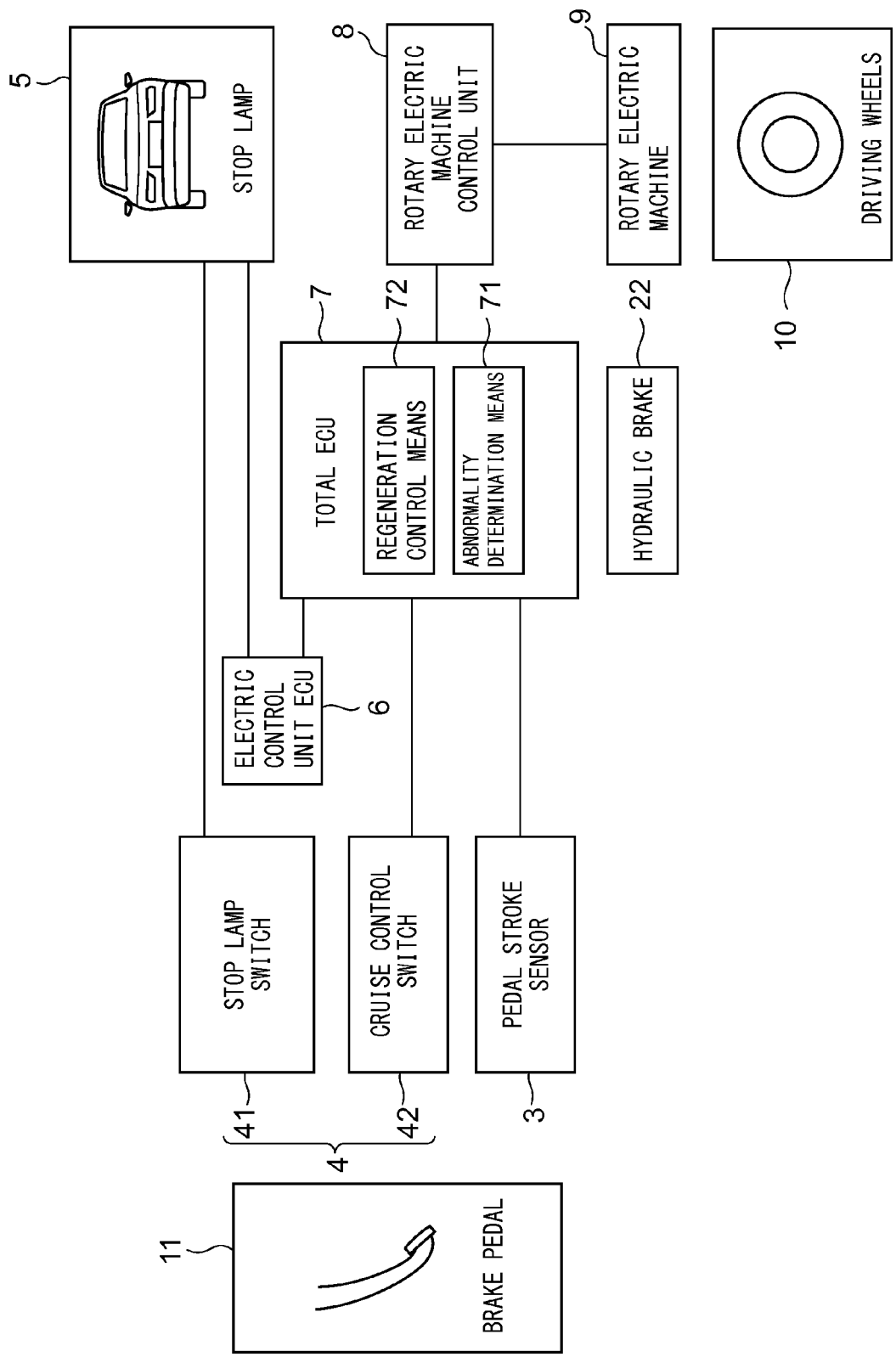
FIG. 5 is a block diagram showing a control structure of a brake control device according to one embodiment of the invention.

FIG. 5 shows a block diagram of a control unit of the brake control device according to this embodiment of the invention. As shown in FIG. 5, the above-mentioned stop lamp switch 41 is connected to an electric control unit ECU 6. In this embodiment of the invention, the electric control unit ECU 6 outputs an on-signal and an off-signal of the stop lamp switch 41 to the total electric control unit ECU 7, while lighting up the stop lamp 5 of the vehicle. Thus, when the stop lamp switch 41 is turned on, the electric control unit 6 lights up the stop lamp 5, whereas when the stop lamp switch 41 is turned off, the stop lamp 5 is turned off.

The above-mentioned pedal stroke sensor 3, cruise control switch 42, and electric control unit 6 are connected to the total electric control unit ECU 7. In this embodiment of the invention, the total ECU 7 controls the generator (rotary electric machine) 9 via a generator control unit (rotary electric machine control unit) 8 based on inputs from the pedal stroke sensor 3, the cruise control switch 42, and the electric control unit ECU 6.

As shown in FIG. 5, the total ECU 7 includes abnormal determination means 71 and regeneration control means 72. The abnormal determination means 71 determines the abnormality of the pedal stroke sensor 3, the stop lamp switch 41, and the cruise control switch 42. The abnormal determination means determines the abnormality of these devices based on various types of information (information managed by the total ECU 7). The regeneration control means 72 manages the constant-speed traveling (auto-cruise) of the vehicle, and also sets a regenerative torque corresponding to the pressing amount of the brake pedal 11 to the generator 9 based on the pressing amount of the brake pedal 11. Specifically, when the pedal stroke sensor 3 is determined to be normal, the regenerative torque corresponding to the pressing amount of the brake pedal 11 is set to the generator (rotary electric machine) 9 based on the pressing amount of the brake pedal 11 input from the pedal stroke sensor 3. On the other hand, when the pedal stroke sensor 3 is determined to be abnormal, under the condition that the stop lamp switch 41 and the cruise control switch 42 are normal, a regenerative torque is set to the generator (rotary electric machine) 9 based on signals input from the electric control unit ECU 6 and the cruise control switch 42. Thus, drive wheels 10 are braked.

Figure 6:
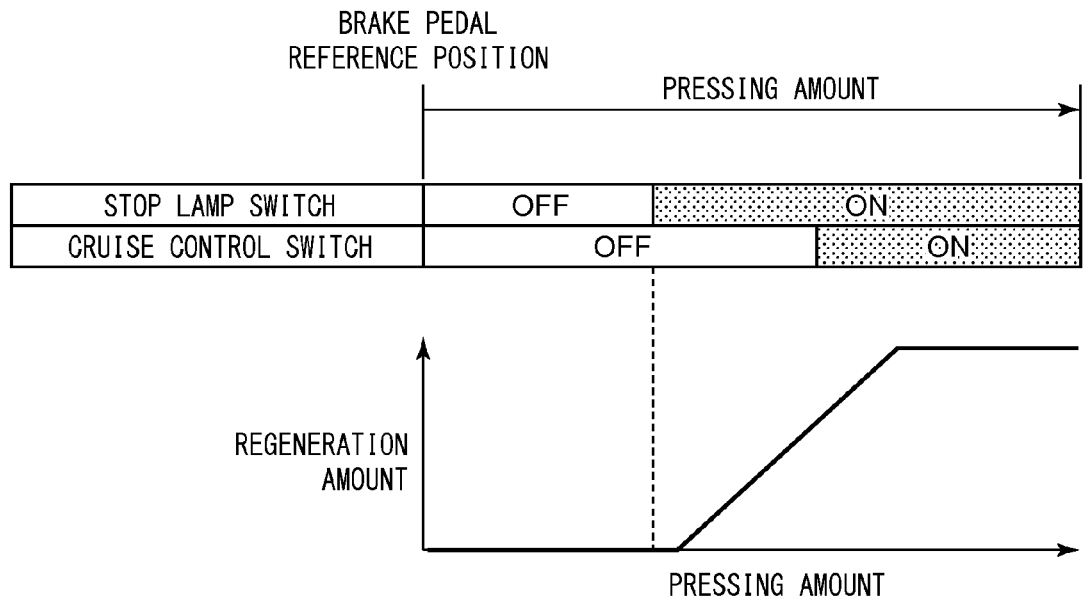
FIG. 6 is a diagram showing the relationship between the pressing amount of the brake pedal and the regeneration amount of a rotary electric machine when a pedal stroke sensor is normal.
Figure 7:
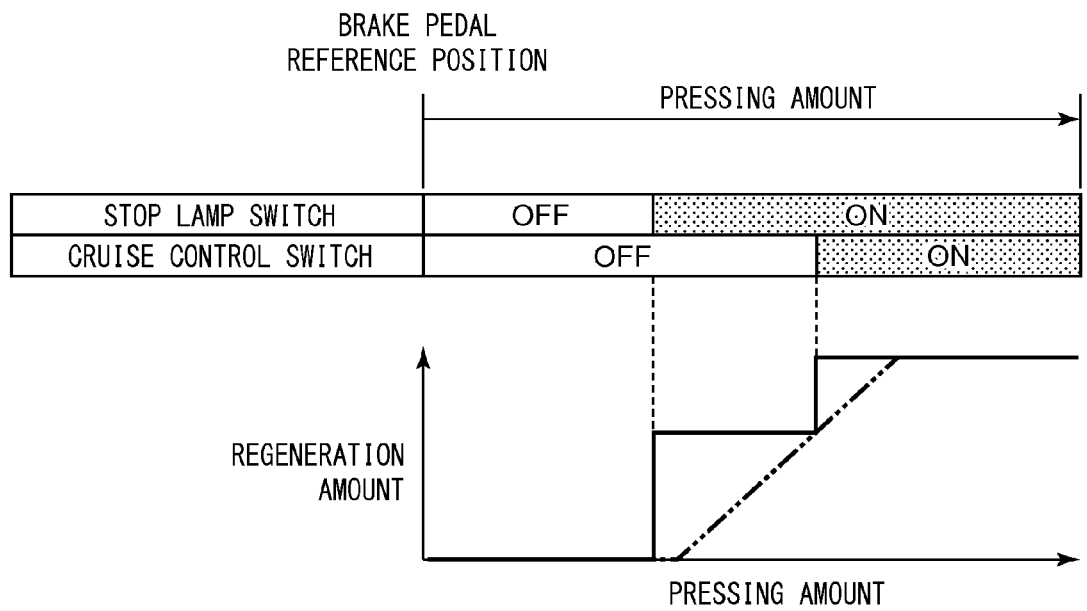
FIG. 7 is a diagram showing the relationship between the pressing amount of the brake pedal and the regeneration amount of the rotary electric machine when the pedal stroke sensor is determined to be abnormal.

FIG. 6 shows a diagram of the relationship between the pressing amount of the brake pedal and the regeneration amount of the rotary electric machine when the pedal stroke sensor 3 is normal. FIG. 7 shows a diagram of the relationship between the pressing amount of the brake pedal and the regeneration amount of the rotary electric machine when the pedal stroke sensor 3 is determined to be abnormal.

As shown in FIG. 6, when the pedal stroke sensor 3 is normal, the amount detected by the pedal stroke sensor 3 is regarded as the pressing amount of the brake pedal 11 as it is. Thus, the regenerative torque corresponding to the pressing amount of the brake pedal 11 is set to the generator (rotary electric machine) 9, so that the regeneration amount corresponding to the pressing amount of the brake pedal 11 can be obtained.

In an example shown in FIG. 6, the brake pedal 11 is pressed down to turn on the stop lamp switch 41. Thus, the electric control unit ECU6 lights up the stop lamp 5 of the vehicle. After a while, the regeneration amount gradually increases in response to the pressing amount of the brake pedal 11. The reason why the regeneration amount starts increasing after the stop lamp switch 41 is turned on is due to the looseness of the brake pedal 11.

When the brake pedal 11 is further pressed, the cruise control switch 42 is turned on. Thus, the total ECU 7 releases the constant-speed traveling (auto-cruise). After a while, the regeneration amount becomes constant regardless of the pressing amount of the brake pedal 11. The regeneration amount at this time is the maximum regeneration amount previously set. The maximum regeneration amount defined here varies depending on the speed of the vehicle.

As shown in FIG. 7, when the pedal stroke sensor 3 is determined to be abnormal, the amount detected by the pedal stroke sensor 3 is abnormal, and thus cannot be used as the pressing amount of the brake pedal 11. Thus, when the pedal stroke sensor 3 is determined to be abnormal, the pressing amount of the brake pedal 11 is detected from the stop lamp switch 41 and the cruise control switch 42. In this way, when the stop lamp switch 41 is turned on, a predetermined regenerative torque (first regenerative torque) is set to the generator 9. When the cruise control switch 42 is turned on, the maximum generative torque (second generative torque) previously determined is set to the generator 9.

In an example shown in FIG. 7, the brake pedal 11 is pressed down to turn on the stop lamp switch 41. Thus, the stop lamp 5 of the vehicle is lit up from the hardware side. At this time, a predetermined regenerative torque is set to the generator (rotary electric machine) 9. The predetermined regenerative torque is a regenerative torque produced when the cruise control switch 42 is turned on while the pedal stroke sensor 3 is normal, in other words, a regenerative torque corresponding to the pressing amount of the pedal when the cruise control switch 42 is turned on.

When the brake pedal 11 is further pressed, the cruise control switch 42 is turned on. Thus, the total ECU 7 releases the constant-speed traveling. At this time, the predetermined maximum regenerative torque is set to the generator (rotary electric machine) 9. The predetermined maximum torque is a regenerative torque produced when the brake pedal 11 is pressed to the maximum, in other words, a regenerative torque corresponding to the pressing amount of the brake pedal 11 when the pedal is being pressed to the maximum. The maximum torque defined here varies depending on the speed of the vehicle.

Figure 8:
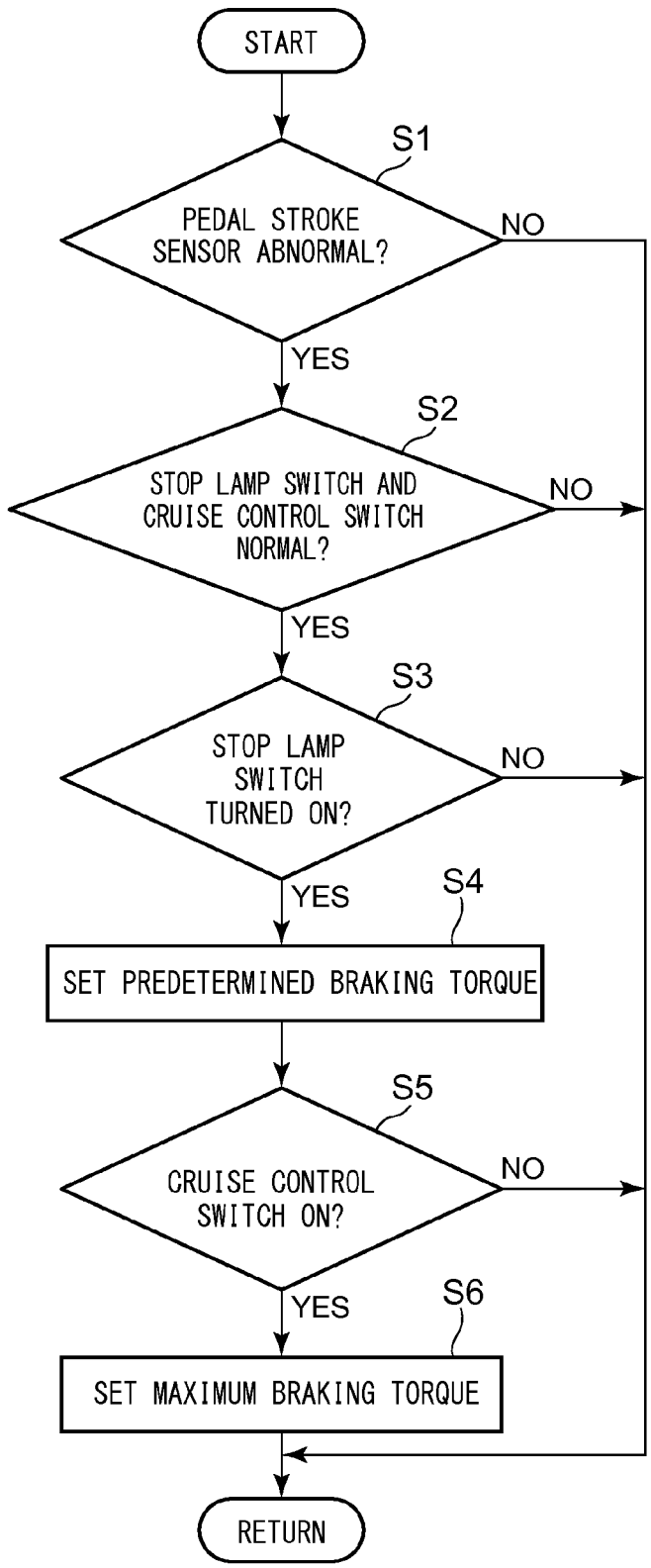
FIG. 8 is a flowchart showing the contents of processing performed when the pedal stroke sensor is determined to be abnormal.

FIG. 8 is a flowchart showing the contents of processing performed when the pedal stroke sensor is determined to be abnormal. As shown in FIG. 8, when the pedal stroke sensor 3 becomes abnormal, the abnormality occurs in various information managed by the total ECU 7. Thus, the abnormality determination means 71 determines that the brake stroke sensor is abnormal (Yes in step S1). When the abnormality determination means 71 determines that the pedal stroke sensor 3 is abnormal, then the abnormality determination means 71 determines whether or not the stop lamp switch 41 and the cruise control switch 42 become abnormal (in step S2). When the abnormality determination means 71 determines that the stop lamp switch 41 and the cruise control switch 42 are not abnormal, the regeneration control means 72 is on standby until the stop lamp switch 41 is turned on (No in step S3).

When the brake pedal 11 is pressed to turn on the stop lamp switch 41 (Yes in step S3), the stop lamp 5 of the vehicle is lit up from the hardware side. On the other hand, the regeneration control means 72 sets the predetermined regenerative torque to the generator (rotary electric machine) 9 via the generator control unit (rotary electric machine control unit) 8 (in step S4). As mentioned above, the predetermined regenerative torque is a regenerative torque produced when the cruise control switch 42 is turned on while the pedal stroke sensor 3 is normal, in other words, a regenerative torque corresponding to the pressing amount of the pedal when the cruise control switch 42 is turned on.

When the brake pedal 11 is pressed to turn on the cruise control switch 42 (Yes in step S5), the regeneration control means 72 releases the constant-speed traveling of the vehicle, and sets the maximum regenerative torque to the generator (rotary electric machine) 9 via the generator control unit (rotary electric machine control unit) 8 (in step S6). As mentioned above, the maximum regenerative torque is a regenerative torque produced when the brake pedal 11 is pressed to the maximum, in other words, a regenerative torque corresponding to the pressing amount of the brake pedal 11 when the pedal is being pressed to the maximum.

The brake control device of the above embodiments of the invention sets the predetermined regenerative torque to the rotary electric machine when the stop lamp switch is turned on even though the pedal stroke sensor is broken down. When the cruise control switch is turned on, the predetermined maximum regenerative torque is set to the rotary electric machine. Thus, the regenerative braking force is increased in stages, which can reduce the driver's uncomfortable feeling even when the pedal stroke sensor is broken down.

The generator described in the above embodiments of the invention may cover the case of using a motor as the generator. For example, the generator as used herein can also include an electric machinery (electric motor) serving as a generator for regenerating kinetic energy into electric energy in a hybrid vehicle (PHEV) or electric vehicle (EV).

In the description of the above embodiments of the invention, two-stage torques, namely, the predetermined regenerative torque and the maximum regenerative torque are set. However, the invention is not limited thereto, and may be set to have a plurality of setting patterns, for example, three or more stage setting patterns.

Further, in the description of the above embodiments of the invention, the generator 9 is set to the predetermined maximum regenerative torque when the cruise control switch 42 is turned on. However, the invention is not limited thereto. The generator may be set to a torque higher than the first regenerative torque, for example, a torque that is twice as high as the first regenerative torque, or the maximum regenerative torque that is set at the rotary electric machine. In this way, the maximum regenerative torque is set as a certain value and not as a variable value depending on the vehicle speed or the like, which can simplify the control of the maximum regenerative torque.

INDUSTRIAL APPLICABILITY

At least one embodiment of the invention can control the regenerative braking force without making the driver feel uncomfortable even when the operation amount detection means for detecting the operation amount of the brake pedal is broken down. Accordingly, the invention is suitable for a brake control device for controlling the regenerative braking force of a hybrid car and an electric car.

What is claimed is:

1. A brake control device, comprising:
   an operation amount detection unit for detecting an operation amount of a brake pedal;
   an abnormality determination unit for determining abnormality of the operation amount detection unit;
   a stop lamp switch adapted to light up a stop lamp of a vehicle that is an OFF state when the operation amount of the brake pedal is less than a predetermined first operation amount, and switches to an ON state when the operation amount is equal to or greater than the predetermined first operation amount;
   a cruise controller release switch for releasing constant-speed traveling of the vehicle that is in an OFF state when the operation amount of the brake pedal is less than a predetermined second operation amount, and switches to an ON state when the operation amount is equal to or greater than the predetermined second operation amount, the second operation amount being larger than the first operation amount; and
   a regeneration control unit adapted to set a regenerative torque corresponding to the operation amount detected by the operation amount detection unit to a rotary electric machine when the abnormality determination unit determines that the operation amount detection unit is normal, and also adapted to make information from the operation amount detection unit invalid when the abnormality determination unit determines that the operation amount detection unit is abnormal, thereby setting a first predetermined regenerative torque to the rotary electric machine when the stop lamp switch is in the ON state and the cruise controller release switch is in the OFF state, and a second predetermined regenerative torque which is larger than the first regenerative torque to the rotary electric machine when the stop lamp switch and the cruise controller release switch are in the ON state.

2. The brake control device according to claim 1, further comprising:
   a hydraulic brake using hydraulic pressure;
   a hydraulic braking detection unit for detecting an operation amount of the brake pedal in a detection way different from the operation amount detection unit; and
   a hydraulic braking control unit for setting a braking torque corresponding to the operation amount detected by the hydraulic braking detection unit, to the hydraulic brake,
   wherein the hydraulic braking detection unit is adapted to detect a pressing amount of the brake pedal as an amount of change in hydraulic pressure, and wherein the operation amount detection unit is adapted to detect the pressing amount of the brake pedal as an electric signal.

3. The brake control device according to claim 2, wherein when the abnormality determination unit determines that the operation amount detection unit is normal, the regeneration control unit is adapted to set the second regenerative torque such that the second regenerative torque is equal to a maximum regenerative torque to be set at the rotary electric machine.

4. The brake control device according to claim 1, wherein when the abnormality determination unit determines that the operation amount detection unit is normal, the regeneration control unit is adapted to set the second regenerative torque such that the second regenerative torque is equal to a maximum regenerative torque to be set at the rotary electric machine.

* * * * *